April 25, 1944.  W. F. STEPHENSON  2,347,616
RADIUS GRINDER
Filed Nov. 14, 1941   3 Sheets-Sheet 1

Fig. 1.

William F. Stephenson
INVENTOR

BY Victor J. Evans & Co.
ATTORNEYS

April 25, 1944.  W. F. STEPHENSON  2,347,616
RADIUS GRINDER
Filed Nov. 14, 1941  3 Sheets-Sheet 2
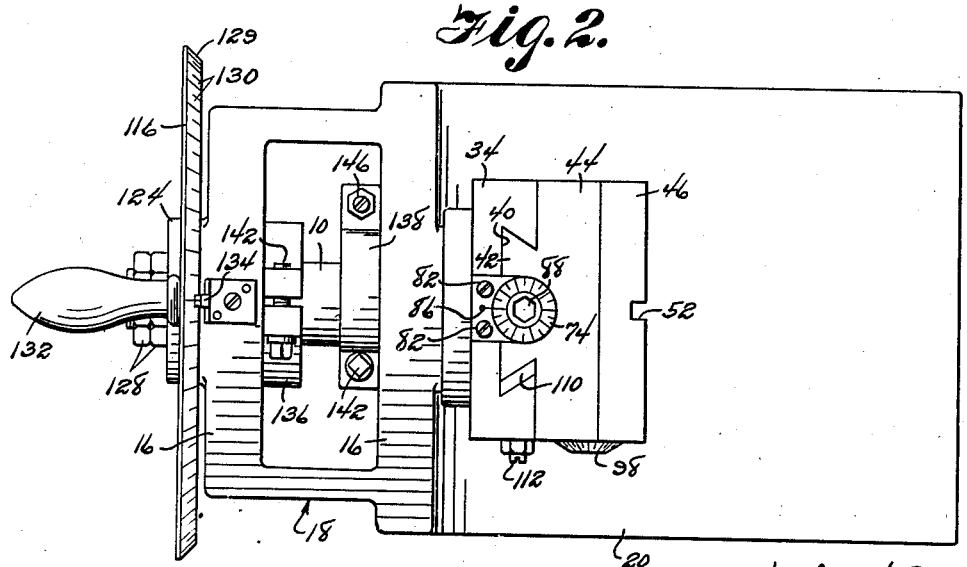
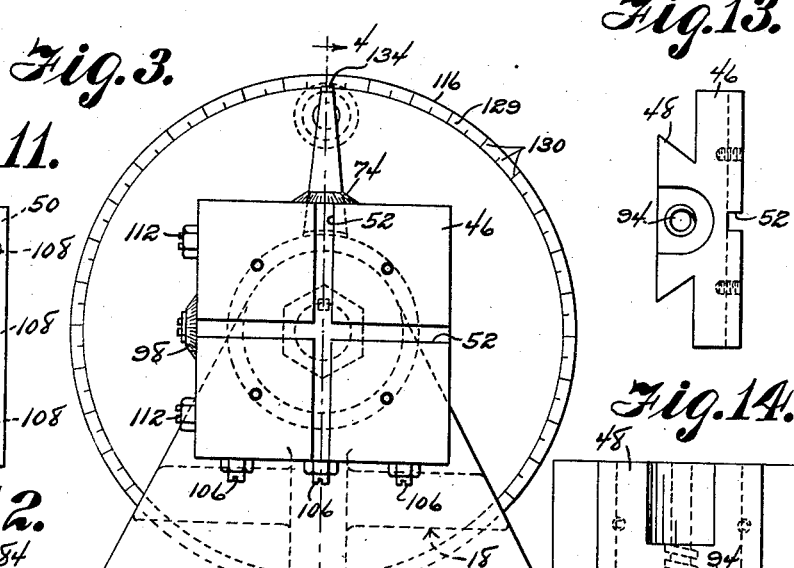
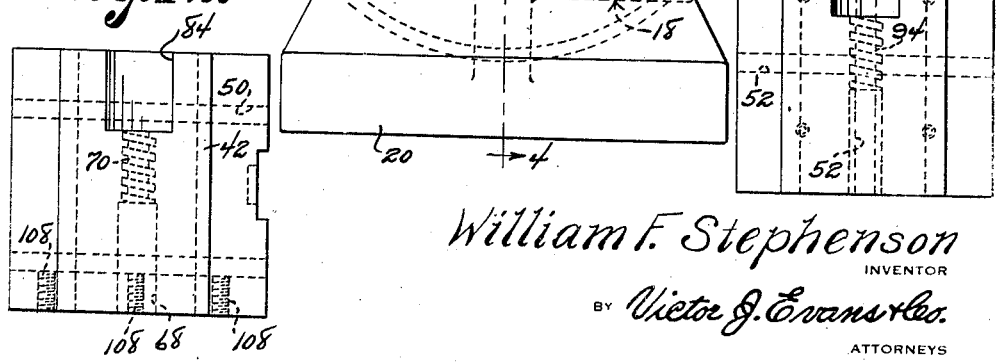
William F. Stephenson
INVENTOR
BY Victor J. Evans & Co.
ATTORNEYS April 25, 1944.  W. F. STEPHENSON  2,347,616
RADIUS GRINDER
Filed Nov. 14, 1941  3 Sheets-Sheet 3
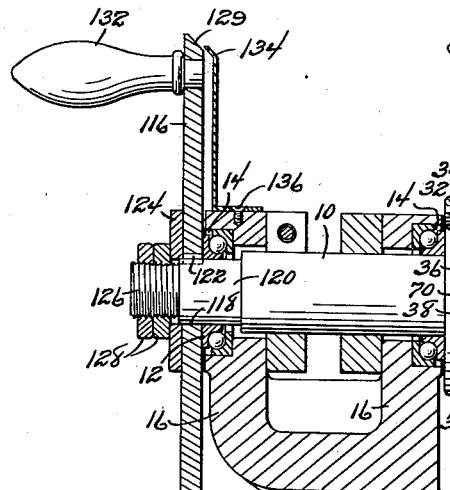
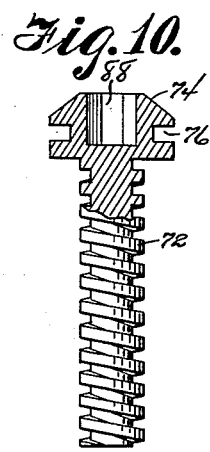
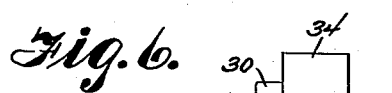
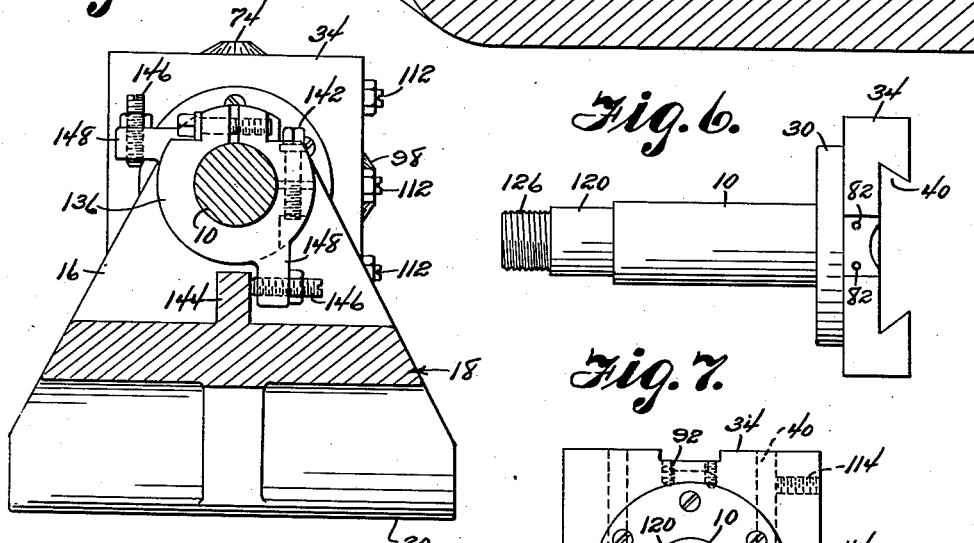
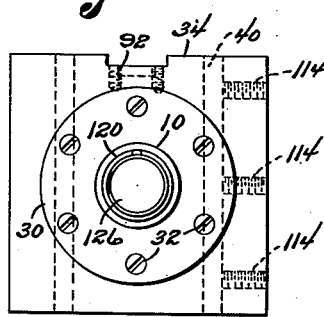
William F. Stephenson INVENTOR
BY Victor J. Evans & Co.
ATTORNEYS Patented Apr. 25, 1944

2,347,616

UNITED STATES PATENT OFFICE 2,347,616

RADIUS GRINDER

William F. Stephenson, Royal Oak, Mich.

Application November 14, 1941, Serial No. 419,184

5 Claims. (Cl. 51—234)

My invention relates to the art of grinding tools, gages and the like, and has among its objects and advantages the provision of an improved radius grinder.

In the accompanying drawings:

Figure 1 is a side elevational view of the invention;

Figure 2 is a top plan view;

Figure 3 is a front elevational view;

Figure 4 is a longitudinal sectional view;

Figure 5 is a view taken from the position indicated by line 5—5 of Figure 1;

Figure 6 is an elevational view of a spindle shaft;

Figure 7 is an end view of the spindle shaft;

Figure 8 is a plan view of a micrometer screw key;

Figure 9 is a sectional view along the line 9—9 of Figure 8;

Figure 10 is a fragmentary view of one of the micrometer screws;

Figure 11 is an end view of a slide block having a dovetail rib and a dovetail groove;

Figure 12 is a face view of the slide block;

Figure 13 is an end view of a faceplate having a dovetail rib for reception in the dovetail groove in the slide block; and Figure 14 is a face view of the faceplate.

In the embodiment selected for illustration, a spindle 10 is supported in bearings 12 of the angular contact type. These bearings are so arranged as to provide rigid axial supports in both directions, but the spindle may be oscillated in the bearings. Each bearing 12 is mounted in a recess 14 in an arm 16 of a bracket 18 having a supporting plate 20. Plate 20 is made secure by a conventional magnetic chuck structure 22 mounted on a base 24. A stop 26 is fixedly secured to the magnetic chuck 22 for engagement with the end 28 of the plate 20.

One end of the spindle 10 is provided with a flange 30 bolted at 32 to a headplate 34. A short centering pin 36 is provided on the flange 30 coaxially with the spindle 10 and receivable in a bore 38 in the headplate 34. In Figure 2, the headplate 34 is provided with a dovetail groove 40 for the reception of a dovetail rib 42 on a slide plate 44. A faceplate 46 is provided with a dovetail rib 48, see Figures 1 and 4, receivable in a dovetail groove 50 in the slide plate 44. The groove 50 in the plate 44 is arranged at right angles to the rib 42 on the slide plate 44. Thus the slide plate 44 may be shifted relatively to the headplate 34 longitudinally of the groove 40 in the headplate, and the faceplate 46 may be shifted relatively to the slide plate 44 longitudinally of the groove 50 but at right angles to the direction of travel of the slide plate.

The faceplate 46 constitutes a mount for work to be ground. Two intersecting grooves 52 are provided in the outer face of the faceplate, which grooves are arranged in right angular relation and serve as keyways for the reception of keys 54 on angles or other devices 56 bolted at 58 to the faceplate for supporting work in grinding proximity to the wheel 60. Figure 1 illustrates a snap gage 62' in position in the angles 56, but other types of work may be handled equally well by the grinder and supported by any suitable fixtures which may be bolted to the faceplate.

The wheel 60 is carried by a spindle structure 62 associated with an upstanding support 64, the spindle structure 62 being, of course, shiftable. The wheel 60 and its mount and operating means are old and well-known in the art and need not be described in greater detail.

In Figure 4, the rib 42 of the slide plate 44 is provided with a longitudinal bore 68 having a threaded extent 70 for coaction with a screw 72 having a graduated head 74. A circumferential groove 76 is provided in the head 74 for the reception of a correspondingly curved lip 78 on a key plate 80. Figures 8 and 9 illustrate the specific construction of the plate 80. This plate is fixedly secured to the headplate 34 by screws 82 threaded into the headplate 34 and having their heads countersunk in the plate 80.

Figure 4 illustrates the rib 42 as being provided with a recess 84 to provide accommodation for the head 74, as when the slide plate 44 is adjusted relatively to the headplate 34. While the screw 72 may be rotated for shifting the slide plate 44, the lip 78 restrains the screw from relative axial movement with respect to the headplate 34. Figure 2 illustrates an index line 86 on the plate 80 for coaction with the graduations on the head 74.

In Figure 10, the graduated head 74 of the screw 72 is provided with a hexagonally shaped axial bore 88 for the reception of a similarly shaped tool to facilitate rotation of the screw. The plate 80 lies in a recess 92 in the headplate 34.

Figures 13 and 14 illustrate the faceplate 46 as having its rib 48 provided with a threaded bore 94 identical with the threaded extent 70 for coaction with an adjusting screw 96, see Figure 4, having a graduated head 98 identical with the graduated head 74. A plate 100, see Figure 1, is provided for the head 98, which plate is identical with the plate 80, so that the faceplate 46 may be adjusted relatively to the slide plate 44 longitudinally of the groove 50 in the same manner as the slide plate 44 is adjusted relatively to the headplate 34 through rotation of the screw 72. An index line 102 is provided on the plate 100 for coaction with the graduations on the head 98.

A gib 104 is positioned between one side face of the rib 48 and one side wall face of the groove 50. Lock screws 106 are receivable in threaded openings 108 in the slide plate 44 and engage the gib for fixedly securing the faceplate 46 with respect to the slide plate 44 when once the precise relative positions have been determined. A similar gib 110 is positioned between one side face of the rib 42 and one side wall face of the groove 40, this gib also being engaged by lock screws 112 to the end that the headplate 34 and the slide plate 44 may be fixed in precise relative positions. The lock screws 112 are threaded into bores 114 in the headplate 34, which bores are illustrated in Figure 7.

Referring to Figure 4, a circular plate 116 is provided with a central opening 118 for the reception of the shaft 120 comprising a smaller diameter continuation of the spindle 10. A key 122 secures the plate 116 against relative rotary movement on the shaft 120, and a washer 124 fits on the shaft 120 for pressing the plate 116 against one of the bearings 14. The shaft 120 is provided with a threaded pin 126 provided with lock nuts 128 which clamp the washer 124 against the plate 116. The plate 116 is provided with a peripheral face 129 obliquely arranged to the plane of the plate and provided with graduations 130. A handle 132 secured to the plate 116 facilitates rotation thereof, and an index finger 134 is bolted at 136 to one of the arms 16 and coacts with the graduations 130 to facilitate observation of the degree of rotation imparted to the spindle 10.

Two split collars 136 and 138 are mounted on the spindle 10, each being provided with projections 140 coacting with a clamp screw 142 for fixedly clamping the collar upon the spindle. Figure 5 illustrates the bracket 18 as being provided with a web 144 which constitutes a stop for limiting the rotary motion of the spindle 10 beyond predetermined limits. An adjustable stop pin 146 is threaded through an arm 148 on each of the collars 136 and 138 for engagement with the web 144. Thus the collars 136 and 138 may be rotated on the spindle 10 and made secure to vary the rotary range of the spindle 10, and precise rotary limitations may be secured through adjustment of the screws 146, with the graduations 130 facilitating precise adjustment of the screws so as to exactly limit the rotary range of the spindle within preselected limitations.

In operation, the present device is designed for the purpose of grinding radii on various types of tools and devices without resorting to the usual form grinding, which is frequently a tedious procedure if an element of precision is required. The slide plate 44 and the faceplate 46 may be shifted one to the other and with respect to the headplate 34 so as to position the point of intersection between the grooves 52 coincident with the axis of the spindle 10.

After the work has been secured to the faceplate 46, the slide plate 44 and the faceplate 46 are relatively shifted through the medium of the respective micrometer screws 72 and 96 to locate the work in proper relation to the spindle axis. The entire assembly, which comprises the spindle, the headplate 34, the slide plate 44, the faceplate 46 and the work, may then be rotated as a unit. The axis of the radius to be ground is located coaxially with the axis of the spindle 10, and the assembly is rotated relatively to the grinding wheel 60.

Of course, the perimeter of the grinding wheel is set at a distance above or laterally of the axis of the spindle 10 corresponding to the radius to be ground. The stopping action of the collars 136 and 138 prevents rotation of the spindle beyond predetermined limits, so as to guard against rotation of the assembly beyond the predetermined limits to facilitate blending of the radius being ground into a straight surface of the work, or with respect to another curvature on the work. The device is particularly suitable for radius grinding with respect to snap gages having radiuses on gage points, cutaway plug gages with radiuses on gage lips, and the unlimited number of forms in connection with punctures and die elements requiring accurate radiuses.

Without further elaboration, the foregoing will so fully illustrate my invention, that others may, by applying current knowledge, readily adapt the same for use under various conditions of service.

I claim:

1. A work holder for a radius grinder, comprising a supporting plate, arms extending upwardly from one end of the plate, a web located between and connected to the arms, a spindle journaled in the arms above the web, a face plate carried by the spindle, means for operating the spindle, collars secured to the spindle between the arms, and stop members extending radially from the collars for contact respectively with opposite sides of the web to limit the movement of the spindle in both directions.

2. A work holder as set forth in claim 1, wherein the collars are secured to the spindle by means adapted to permit their adjustment on the spindle to vary the angular relation of the stop members.

3. A work holder as set forth in claim 1, wherein the stop members comprise arms extending radially from the collars and screws extending transversely through the arms for contact with the web, the screws being adjustable on the arms with relation to the web.

4. A work holder as set forth in claim 1, wherein the collars are secured to the spindle by means adapted to permit their adjustment on the spindle to vary the angular relation of the stop members, and wherein the stop members comprise arms extending radially from the collars and screws extending transversely to the arms for contact with the web, the screws being adjustable on the arms with relation to the web.

5. A work holder for a radius grinder, comprising a supporting plate, arms extending upwardly from one end of the plate, a spindle journaled in the arms parallel to the plate, a face plate, means of securing the face plate to the spindle directly above the supporting plate, said means being adapted to permit the face plate to be adjusted radially with relation to the spindle, and means for operating the spindle.

WILLIAM F. STEPHENSON.